Oct. 13, 1970 R. HAFLE 3,534,360

ANALOG TO DIGITAL ENCODER

Filed Dec. 27, 1966 4 Sheets-Sheet 1

Inventor
Ralph Hafle
By Burmeister & Kulie
Attorneys

Oct. 13, 1970 R. HAFLE 3,534,360

ANALOG TO DIGITAL ENCODER

Filed Dec. 27, 1966 4 Sheets-Sheet 2

Inventor
Ralph Hafle
By Burmeister & Kulie
Attorneys

ANALOG TO DIGITAL ENCODER

Filed Dec. 27, 1966 4 Sheets-Sheet 3

Inventor
Ralph Hafle
By Burmeister & Kulie
Attorneys

Inventor
Ralph Hafle
By Burmeister & Kulie
Attorneys

United States Patent Office 3,534,360
Patented Oct. 13, 1970

3,534,360
ANALOG TO DIGITAL ENCODER

Ralph Hafle, North Little Rock, Ark., assignor to Baldwin Electronics, Inc., Little Rock, Ark., a corporation of Arkansas Filed Dec. 27, 1966, Ser. No. 604,909
Int. Cl. H03k *13/02;* G08c *9/06*
U.S. Cl. 340—347 4 Claims

ABSTRACT OF THE DISCLOSURE

This application discloses a device for digitizing shaft angle positions by photoelectric interrogation of a code disc. The code disc employs a plurality of coaxial tracks of opaque and transparent sectors which are interrogated by periodically pulsing a light source confronting one side of the code disc and noting the electrical response of a plurality of photocells confronting the tracks of the code disc on the side of the code disc opposite the light source. The encoder is also provided with circuitry for generating a plurality of digits from the least significant track of the code disc and circuitry to add this plurality of digits generated from the least significant track of the code disc to the digits generated from the other tracks of the code disc.

The present invention relates generally to analog to digital encoders and particularly to shaft angle analog to digital encoders.

United States Pat. No. 2,986,726 of Edward M. Jones, dated May 30, 1961, describes a shaft angle photoelectric encoder which utilizes a code disc having a plurality of coarse coaxial tracks containing alternate opaque and transparent sectors which generate a coarse code. The Jones patent also discloses a fine track disposed coaxially about the code disc having alternate transparent and opaque sectors of no greater significance than the least significant track of the coarse tracks, and the fine track of the code disc is utilized to generate five additional digits which are added to the digits generated by the coarse tracks of the code disc. In this manner, the analog to digital encoder of the Jones patent achieves an output having more digits than the number of tracks on the code disc. In other words, for each transparent and each opaque sector of the fine track of the code disc, the encoder of the Jones patent generates five digits by generating four out of phase electrical signals and comparing these signals.

The present invention also generates a plurality of digits from each transparent sector of the code disc, but it is an object of the present invention to generate these digits in a novel, more accurate and simplified manner.

It is also an object of the present invention to provide an optical analog to digital shaft angle encoder of greater resolution than could be achieved in a unit of comparable size in accordance with the prior art.

It is alos an object of the present invention to provide an improved and simplified and more accurate means for correlating the digits generated from the fine track of the encoder with the digits generated from the coarse tracks of the encoder.

While the present invention will be illustrated in connection with a photoelectric encoder, it should be understood that the present invention may be practised with other types of encoders also, provided that rotation of the shaft or displacement of a movable member in relation to a stationary member, as in a linear encoder, causes an encoder response in the form of a plurality or series of sine waves. In accordance with the present invention, a plurality of digits are generated in response to each of the cycles of the sine wave response of the encoder. Further, the present invention is illustrated utilizing a pulsed light source interrogation system, but it also is to be understood that the present invention may be practised with other interrogation systems, such as a sinusoidally varying light source or a constant light source and a periodically actuated photocell.

The present invention will be more fully appreciated by those skilled in the art from a further consideration of this specification, particularly when viewed in the light of the drawings, in which.

Figure 1:
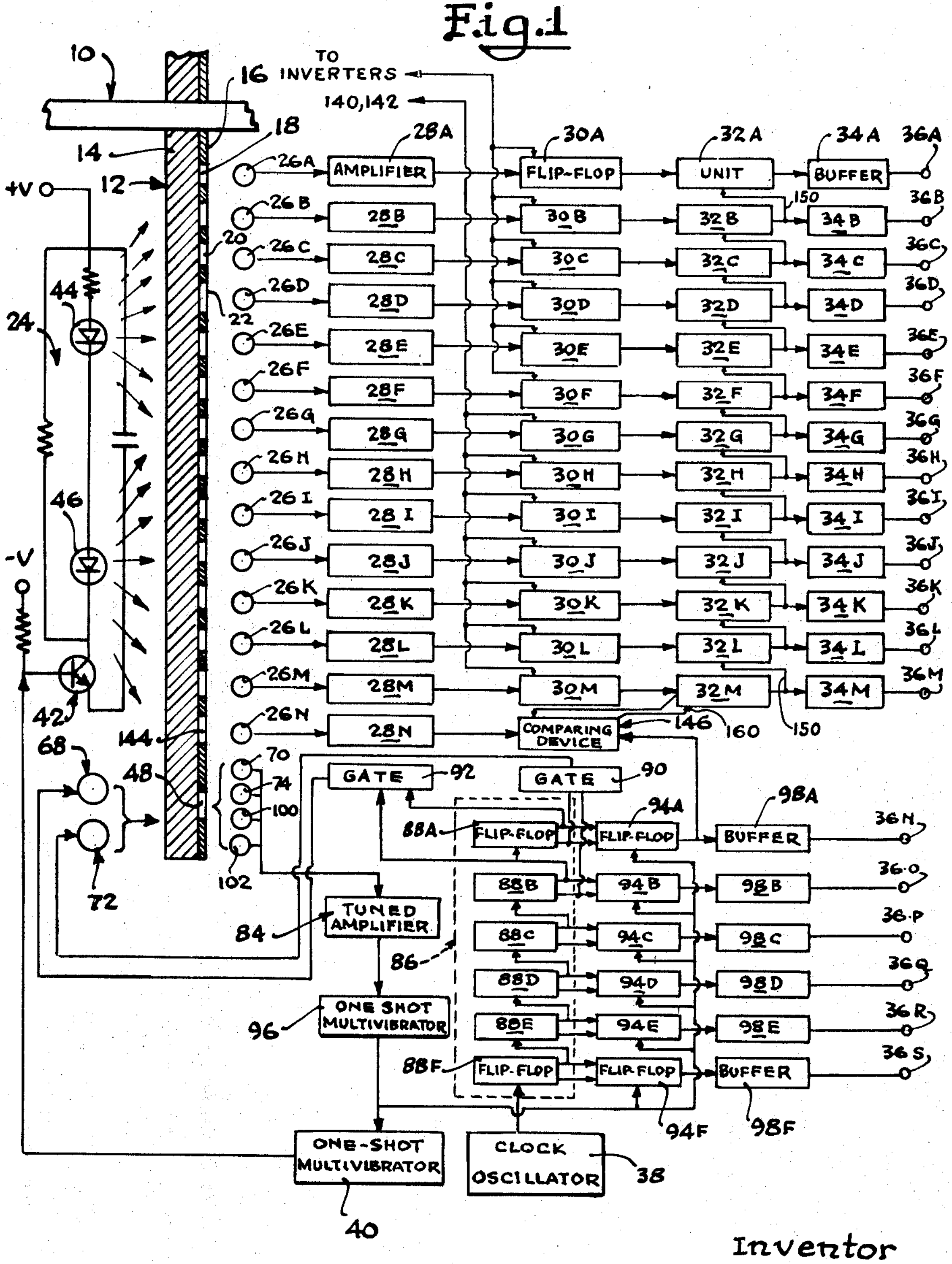
FIG. 1 is a block electrical circuit diagram of an encoder constructed according to the teachings of the present invention.

FIG. 1 illustrates a shaft 10 whose angular position is to be encoded. The shaft 10 carries a code disc 12 which has a base 14 of transparent material, such as glass. A layer 16 of opaque material is disposed on one surface of the base 14, and conventionally the layer 16 is a photographic emulsion. A plurality of tracks 18 extend coaxially about the shaft 10 at different distances therefrom. Each of the tracks 18 consists of alternate sectors of transparent and opaque material, a transparent sector being illustrated at 20, and an opaque sector being illustrated at 22. A light source, generally indicated at 24, is disposed on one side of the code disc 12, and a separate light responsive device confronts each of the tracks 18 of the code disc, the light responsive devices in the particular embodiment described herein being designated 26A, 26B, 26C, 26D, 26E, 26F, 26G, 26H, 26I, 26J, 26K, 26L, 26M, and 26N. Each of the light responsive devices 26A through 26N is a silicon photovoltaic cell.

Figure 7:
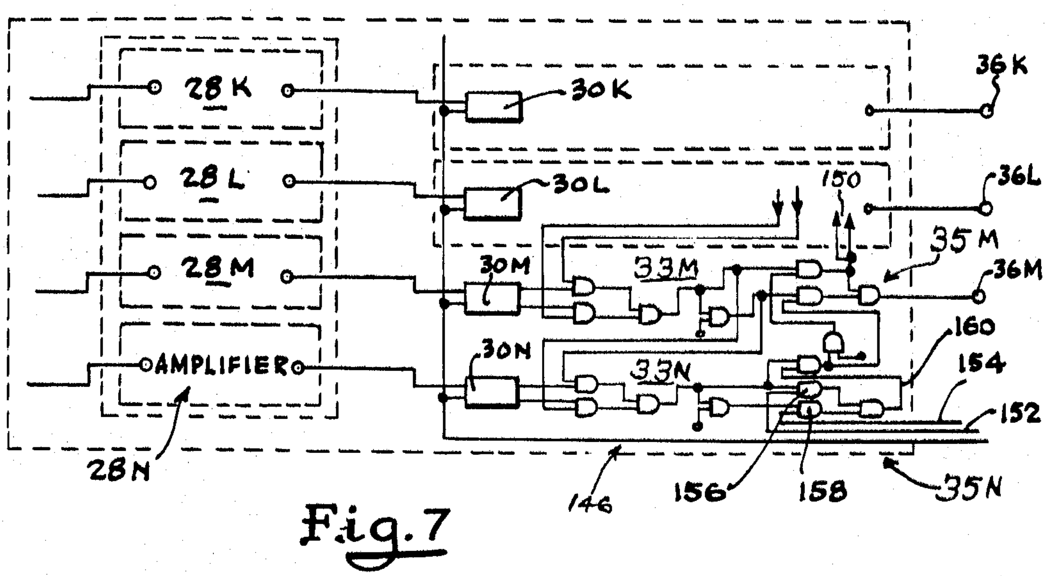
FIG. 7 is a schematic circuit diagram of the correlation device of the encoder of FIGS. 5 and 6.

In the particular embodiment of the invention herein set forth, the code disc 12 is encoded in the Gray binary code, and this code must be converted into the straight binary code. Hence, each of the photocells is connected through an amplifier to a flip-flop, and the flip-flop is connected through a Gray to straight code converter and an add-one circuit to a buffer stage. Hence, photocell 26A is connected through an amplifier 28A to a flip-flop 30A. The output of the flip-flop is connected through a unit 32A which includes a Gray to straight code converter connected to an add-one stage and the output of the add-one stage of the unit 32A is connected through a buffer 34A to an output terminal 36A. In like manner, each of the other photocells 26B, 26C, 26D, 26E, 26F, 26G, 26H, 26I, 26J, 26K, 26L, 26M, and 26N are connected through an amplifier 28B, 28C, 28D, 28E, 28F, 28G, 28H, 28I, 28J, 28K, 28L, 28M and 28N to the input of a flip-flop 30B, 30C, 30D, 30E, 30F, 30G, 30H, 30I, 30J, 30K, 30L, 30M, and 30N. The output of each of the flip-flops is connected through a unit 32B, 32C, 32D, 32,E, 32F, 32G, 32H, 32I, 32J, 32K, 32L, 32M, and 32N, containing a Gray to straight code converter connected to an add-one stage, and through buffer 34B, 34C, 34D, 34E, 34F, 34G, 34H, 34I, 34J, 34K, 34L, and 34M to their respective output terminals 36B, 36C, 36D, 36E, 36F, 36G, 36H, 36I, 36J, 36K, 36L, and 36M. FIG. 7 illustrates the circuit of the Gray to straight converter of the unit 32N, designated 33N, and the add-one stage 35N of that unit. The digits appearing on these output terminals constitute the coarse output of the encoder. The most significant digit appears on output terminal 36A, since the track 18 of the code disc 12 confronting the photocell 26A contains the most significant digits. The least significant digit obtained from the tracks 18 of the code disc 12 appears on the output 36M.

The light source 24 is driven synchronously with a clock oscillator 38 through a one-shot multivibrator 40 and a transister switch 42, as will be more fully described hereinafter. Synchronized with the pulses from the clock oscillator 38, the light source 24 emits pulses of light at a fixed rate. In the particular light source here illustrated, two solid-state gallium arsenide light emitting diodes 44 and 46 are employed, although more conventional lamps may also be employed.

The code disc 12 also has a fine track designated 48, and the fine track 48 is disposed adjacent to the outer perimeter of the disc 12. This track 48 also consists of alternate opaque and transparent sectors. In the particular construction described throughout this application, the code dics 12 has a total of 15 coaxial tracks 18 and 48, and 13 of these tracks are employed in the coarse code. The fifteenth track is the fine track 48 which is utilized to generate a total of 6 additional digits. The fourteenth track, which confronts photocell 26N, is utilized to synchronize the digits generated from the fine track 48 with the digits generated from the coarse tracks of the code disc 12, as will be more fully described hereinafter.

Figures 2, 3, 4:
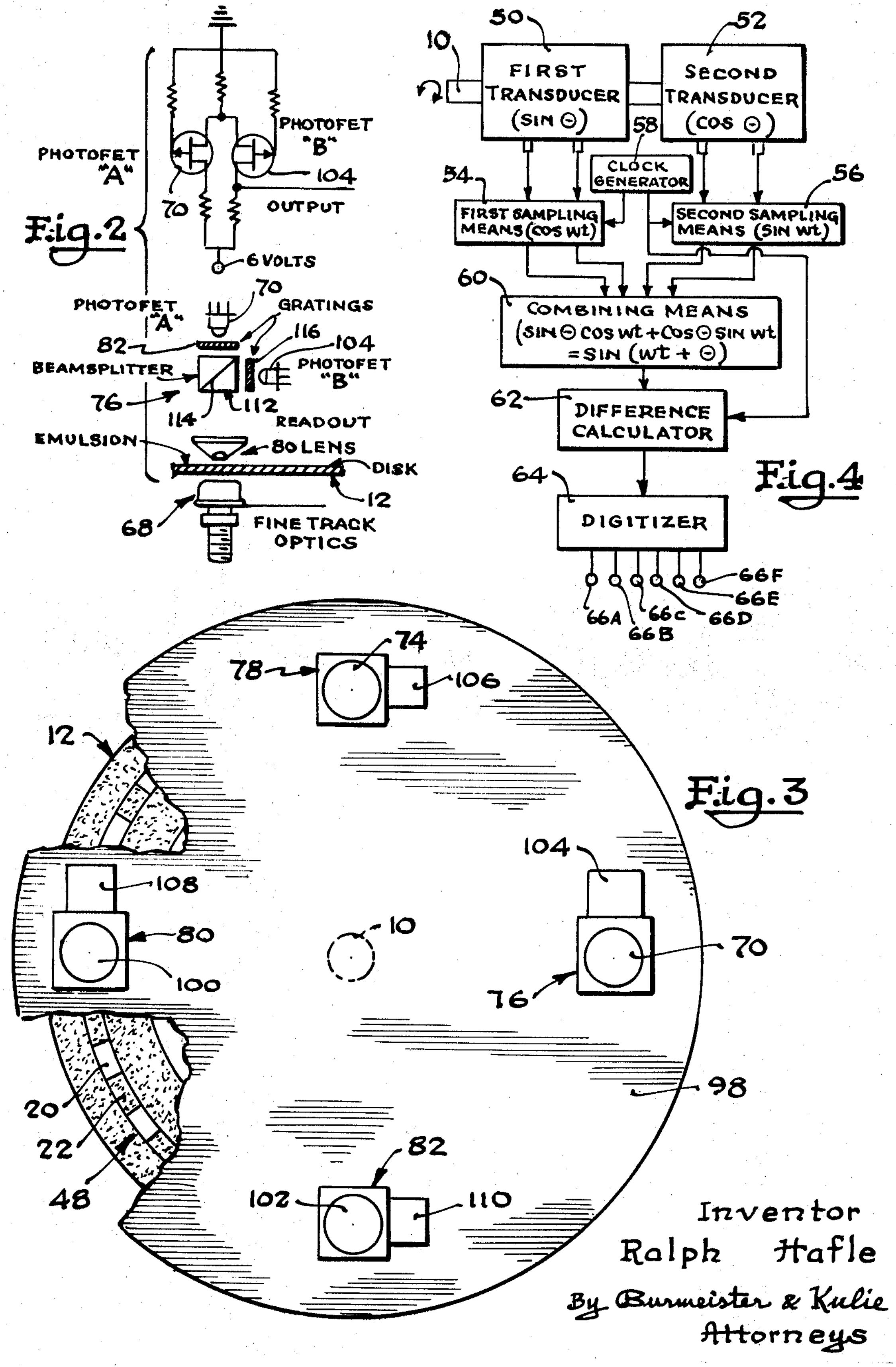
FIG. 2 is a fragmentary plan view of one of the readout stations for the fine track of the encoder of FIG. 1.
FIG. 3 is a plan view of the code disc assembly of the encoder of FIGS. 1 and 2.
FIG. 4 is a block circuit diagram of another embodiment of the invention.

Before describing the manner in which the fine track 48 the code disc 12 is utilized to generate additional digits, the general method by which these additional digits will be generated is considered with reference to FIG. 4. In FIG. 4, the shaft 10 to be encoded is shown mechanically coupled to a first transducer 50 and a second transducer 52. The first transducer may be a photoelectric transducer, such as shown for the coarse tracks of the code disc 12, or it may be a magnetic transducer, a resistive transducer, or some other type of transducer which will produce an electrical output which is a function of the shaft angle. At the arbitrary zero position of the shaft 10, the electrical output of the shaft will also be zero, and on rotation of the shaft one or more complete sine wave cycles will be produced in 360-degree rotation of the shaft 10. The second transducer 52 is identical to the first transducer 50, except that the electrical output is a function of the cosine $\theta$, and hence has a value equal to "one" when $\theta$ is at its arbitrary zero position. If the encoder is to function in the absence of shaft rotation, the first and second transducer must produce proper electrical output while at rest. However, if the transducer need not function at zero rotation rate of the shaft 10, this requirement need not exist.

The output of the first transducer is electrically connected to a first sampling means 54, and the output of the second transducer is electrically connected to a second sampling means 56. The first and second sampling means are under the control of a clock oscillator 58 which produces two electrical outputs. The electrical output connected to the first sampling means is a function of the cos $wt$ while the output applied to the second sampling means is a function of the sin $wt$. The first sampling means 54 generates an electrical signal responsive to the output of the first transducer whenever the signal of the clock generator 58 has its maximum value, or in other words, whenever the electrical angle of the clock generator is zero. One-fourth of a cycle later, the second sampling means 56, under control of the sine function from the clock generator 58 samples a second transducer, since at this time the value of the sine function is a maximum. Thus the output of the first sampling means has the form sin $\theta$ cos $wt$, and the electrical output of the second sampling means thus has the form cos $\theta$ sin $wt$.

The electrical output of the first sampling means and the second sampling means are then impressed upon a combining means 60 which combines the fundamental frequency components of the outputs of the first sampling means and the second sampling means. The output of the combining means may be restricted to the fundamental frequency components of the first and second sampling means by use of a tuned amplifier tuned to the sampling frequency generated by the clock generator 58. The electrical output of the combining means, designated $X$, is in the following form:

$$X = \sin\theta \cos wt + \cos\theta \sin wt = \sin(wt+\theta)$$

The signal $\sin(wt+\theta)$ has a constant peak amplitude regardless of the position of the shaft 10. In addition, this signal has an electrical phase relationship to the electrical signals generated by the clock generator 58 which changes one electrical degree for each encoder angular phase degree of $\theta$. Phase measurement of $\sin(wt+\theta)$ and the electrical signal of a clock generator 58 applied to the second sampling means 56 is thus equivalent to measuring the angle $\theta$.

Thus, the electrical output of the combining means is electrically connected to a difference calculator 62, and the difference in phase calculated in the difference calculator 62 is connected to a digitizer 64 to be reduced to digits in the output of the digitizer, designated 66A, 66B, 66C, 66D, 66E, and 66F. If the first transducer 50 and the second transducer 52 produce an electrical output for one complete revolution of the shaft 10 equal to exactly one sine wave or cosine wave, respectively, then the output of the digitizer will determine the shaft angle $\theta$ for the shaft 10 directly. However, if the first transducer 50 and the second transducer 52 produce electrical outputs consisting of a plurality of sine waves and cosine waves respectively, the output of the digitizer 64 will represent a displacement of the shaft 10 within one cycle of the output of the first transducer 50. In other words, some different and additional mechanism must be employed to determine which cycle of the first and second transducers is being sampled. In the encoder of FIG. 1, the electrical outputs designated 36A through 36M perform this function. In other embodiments, the first transducer cycles could be counted incrementally from an arbitrary starting position.

In the encoder of FIG. 1, the fine track 48 of the code disk 12 is utilized to generate a plurality of digits in essentially the same manner described in connection with FIG. 4. A light source schematically illustrated at 68, the fine track 48 of the code disc, and a light responsive cell 70 constitute the first transducer. In like manner, a second light source 72, the fine track 48 of the code disc 12, and a second light responsive cell 74 constitute the second transducer. It is to be noted that separate tracks could have been provided on the code disc 12 for the two transducers, or separate code discs themselves could be utilized for this purpose. However, as will be discussed hereinafter, the single fine track 48 is utilized to generate electrical outputs corresponding to those generated by the first and second transducer of the embodiment of FIG. 4.

As illustrated in FIG. 3, there are actually four readout stations designated 76, 78, 80 and 82, and these readout stations are disposed at the intersections of two orthogonally related axes passing through the center of the shaft 10 and the track 48. The photoresponsive cells 70 and 74 illustrated are associated with the readout stations 76 and 78, respectively.

FIG. 3 also illustrates the transparent sectors 20 of the code disc 12 and the opaque sectors 22 which are disposed between the transparent sectors 20 of the disc. The first photoresponsive cell 70 confronts and is centered on one of the opaque sectors of the disc 12 while the disc 12 is in its arbitrary zero position. In like manner, the photoresponsive cell 74 confronts and is centered upon a transparent sector when the disc 12 is in its arbitrary zero position. Hence, the two photocells 70 and 74 are located 90 degrees out of phase with each other.

FIG. 2 illustrates the construction utilized in combination with the light source and photocells in order to produce an electrical output which is responsive to a sine or cosine function of shaft angle from the arbitrary zero position. The light source 68, in the form of a solid-state gallium arsenide light emitting diode, confronts a plurality of opaque and transparent sectors of the code disc, and this relatively large portion of the code disc is focused by a lens system 80 on a grating 82 which confronts the photoresponsive cell 70. The grating 82 is a pattern having the same periodicity but a different shape than that portion of the disc 12 confronting the light source 68, and the grating 82 is aligned with the code disc 12 so that at the zero angle position of the code disc 12, opaque sectors of the grating confront transparent sectors of the code disc. In this manner, a plurality of beams of light are either transmitted to the photoresponsive cell 70, thus corresponding to a transparent sector confronting the light source 68 and the photoresponsive cell 70, or a plurality of beams of light are blocked from the photoresponsive cell 70 by the grating 82, thus corresponding to an opaque sector disposed between the light source 68 and the photoresponsive cell 70. The construction of the second light source 72 and the second photocell 74 is identical to that shown in FIG. 2, except that the grating 82 is positioned to interrupt light from the light source 72 to the photoresponsive cell 74 when the code disc 12 is in its zero angle position.

If the light sources 68 and 72 are continuous, rotation of the code disc 12 at a constant rate would result in output of the photocells 70 and 74 in the form of a sine wave and a cosine wave, respectively. Hence, the output from the photocell 70 represents the sine of the angle of the displacement of the shaft within a particular cycle, that is, within the cycle formed by one transparent and one opaque sector of the fine track 48 of the code disc. In like manner, the electrical output of the photocell 74 represents the cosine of the angle of deviation of the shaft within that particular cycle.

The output of photocells 70 and 74 are combined in a tuned amplifier 84 which is tuned to the frequency at which the light sources 68 and 72 interrogate the photocells 70 and 74. The output of the tuned amplifier 84 represents the sin $(wt+\theta)$, where $w$ is $2\pi$ times the frequency of interrogation and $\theta$ is the angle deviation within the cycle of the fine code track 48. The remainder of the system for generating a fine code measures the phase relation or time relation between the resultant phase variable signal sin $(wt+\theta)$ and the modulation of the light sources 68 and 72, or the clock generator 38.

As previously stated, a clock oscillator is utilized to control the sequences of the encoder. Clock oscillator 38 drives the first stage of a multiple stage binary counter 86. Each of the stages of the counter is a divide by two stage in the form of a flip-flop, the flip-flops being designated 88A, 88B, 88C, 88D, 88E, and 88F. In the particular circuit illustrated, the clock oscillator has a frequency of 64 kilocycles and the flip-flops 88F through 88A divide this frequency into 32 kilocycles, 16 kilocycles, 8 kilocycles, 4 kilocycles, 2 kilocycles, and 1 kilocycle, respectively. The binary counter 86 continuously runs through its cycle in response to the output of the clock oscillator 38.

Each of the flip-flops 88A through 88F has a pair of complimentary outputs which have an electric potential representing either a "one" or a "zero." The light source 68 is driven at the frequency of the final flip-flop 88A in the binary counter 86 through a gate circuit 92. The gate circuit 92 is a coincidence circuit and drives the power source 68 into illumination only during periods in which the output of the flip-flop 88A connected to the gate 92 is a "one" and the output of the flip-flop 88B connected to gate 92 is a "zero." In like manner, light source 72 is driven through a coincidence gate 90 connected to the other two outputs of the flip-flops 88A and 88B, respectively, thereby exciting the light source 72 during periods in which the output of flip-flop 88A is "one" and the output of flip-flop 88B is "one." Hence, light source 72 lags light source 68 by one-fourth cycle of the counter flip-flop 88A.

Each of the flip-flops 88A through 88F of the binary counter 86 is connected to a storage device in the form of a flip-flop, these flip-flops being designated 94A, 94B, 94C, 94D, 94E, and 94F. Each of the flip-flops 94A through 94F will be triggered only on receipt of a command pulse at a reset input terminal. This common pulse is supplied by a one-shot multivibrator 96 connected to the output of the tuned amplifier 84, and hence synchronized with the rotational position of the code disc within a particular cycle, the cycle being determined by one opaque sector and one transparent sector of the fine track 48 of the code disc. The one shot multivibrator 96 squares the output signal from the tuned amplifier 84 and actuates the storage devices 94A through 94F to produce a six-digit straight binary code representing the displacement of the code disc within the particular cycle of the code disc confronting the fine track photoresponsive cells 70 and 74 at that instant.

The output of the flip-flop 94A is conducted through a buffer 98A to the output terminal 36N, and in like manner, the outputs of the storage flip-flops 94B, 94C, 94D, 94E, 94F are conducted through buffers 98B, 98C, 98D, 98E, and 98F to output terminals 36O, 36P, 36Q, 36R, and 36S, respectively.

It will be noted that FIG. 1 illustrates four separate photoresponsive cells confronting the track 48, the two cells 70 and 74 previously referred to and two additional cells 100 and 102. These may be located physically in FIG. 3, since cell 100 is mounted on the opposite side of the disc from photocell 70 and cell 102 is mounted on the opposite side of the disc from the cell 78. The electrical outputs of the cells located on opposite sides are added together in order to eliminate radial eccentricity errors.

Figure 5:
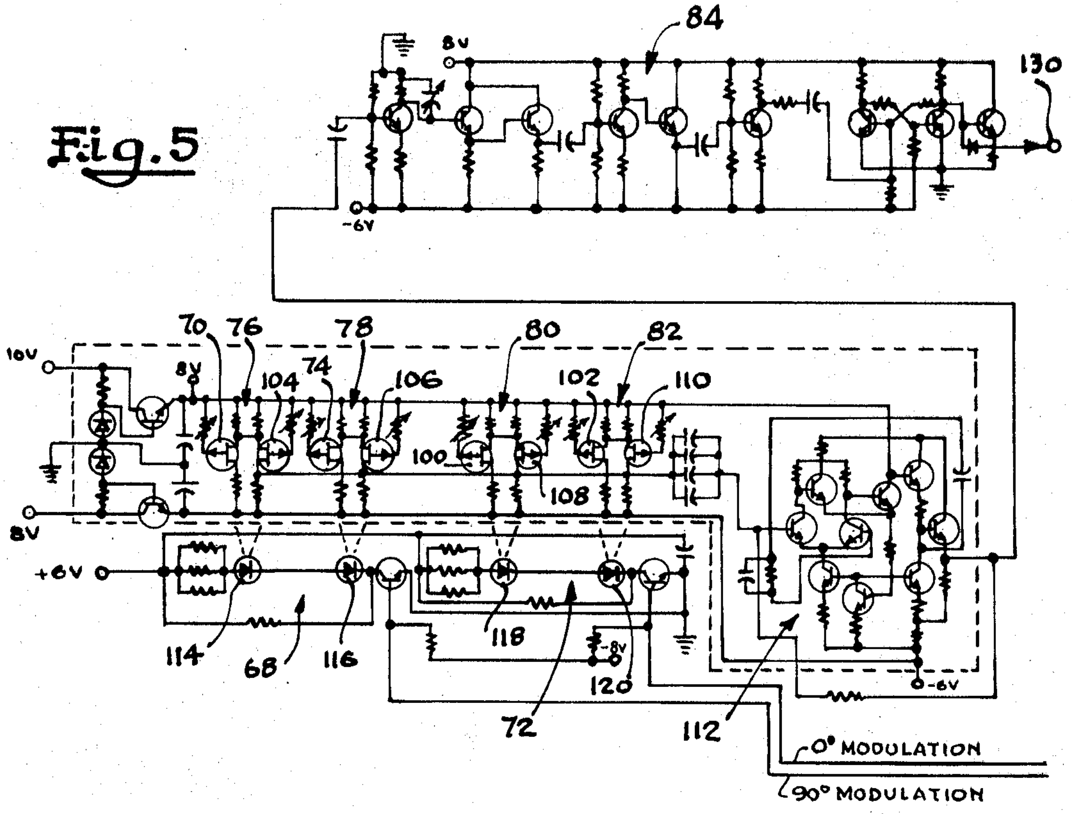
FIG. 5 is a schematic electrical circuit diagram of the photocell circuits of a commercial encoder constructed in the manner of the encoder of FIGS. 1 through 3.

FIG. 5 illustrates in an electrical circuit diagram the device of FIG. 4 for a practical 19-digit photoelectric shaft angle and counter constructed in the manner of FIG. 1, and which utilizes a total of eight photoresponsive cells mounted in four readout stations as shown in FIG. 3. The four readout stations are indicated in FIG. 5, with the photocells previously referred to being so designated. At readout station 76, a second photocell 104 is also mounted, and at readout station 78, a second photocell 106 is mounted. Likewise, at readout station 80, a second photocell 108 is disposed, and at readout station 82, a second photocell 110 is disposed. FIG. 2 illustrates the manner in which the photocells 70 and 104 are mounted at readout station 76. A beam splitter 112 has an interface 114 which permits approximately half of the light from the light source 78 to pass to the photoresponsive cell 70 and reflects approximately half of the light to the photoresponsive cell 104. A grating 116 is disposed between the interface 114 and the photoresponsive cell 104. As indicated in FIG. 5, the photoresponsive cells are so-called "Photofet" cells, that is, light sensitive field-effect transistors. These light sensitive field-effect transistors are physically substantially larger than the photovoltaic cells 26A through 26N.

In FIG. 3 it will be noted that readout station 78 has photocells 74 and 106, readout station 80 has photocells 100 and 108, and readout station 82 has photocells 102 and 110. The grating confronting photocell 100 phases the photocell (100) 180 degrees from the photocell 70, and in like manner, the grating confronting photocells 104 and 108 phase these photocells 180 degrees apart. In like manner, photocells 74 and 102 and photocells 106 and 110 are phased 180 degrees from each other.

The outputs of photocells 70 and 104 are combined as shown in the schematic circuit diagram in FIG. 2 or FIG. 5. The resulting signal is a function of the product of the sine of the angle in the cycle of the code disc times the cosine *wt*. When photocells 74 and 102 are combined, the resulting signal is a function of the product of the cosine of the angle of the code disc times the sine *wt*. In like manner, the photocells at each of the other stations are combined and the entire input of the photocells is impressed upon the preamplifier 112, and hence the tuned amplifier 84. The output of the tuned amplifier has the form sin $(wt+\theta)$, as previously described, but the use of multiple photocells at each readout station provides compensation for errors in radial eccentricity of the code disc, variations in the density of the emulsion forming the opaque and transparent sectors of the fine track 48 and variation in light intensity from the light source.

In FIG. 5, the light source 68 comprises two gallium arsenide cells 114 and 116 connected in series to produce simultaneous light intensity. In like manner, the light source 72 comprises two gallium arsenide cells 118 and 120 connected in series to produce simultaneous light intensity.

Figure 6:
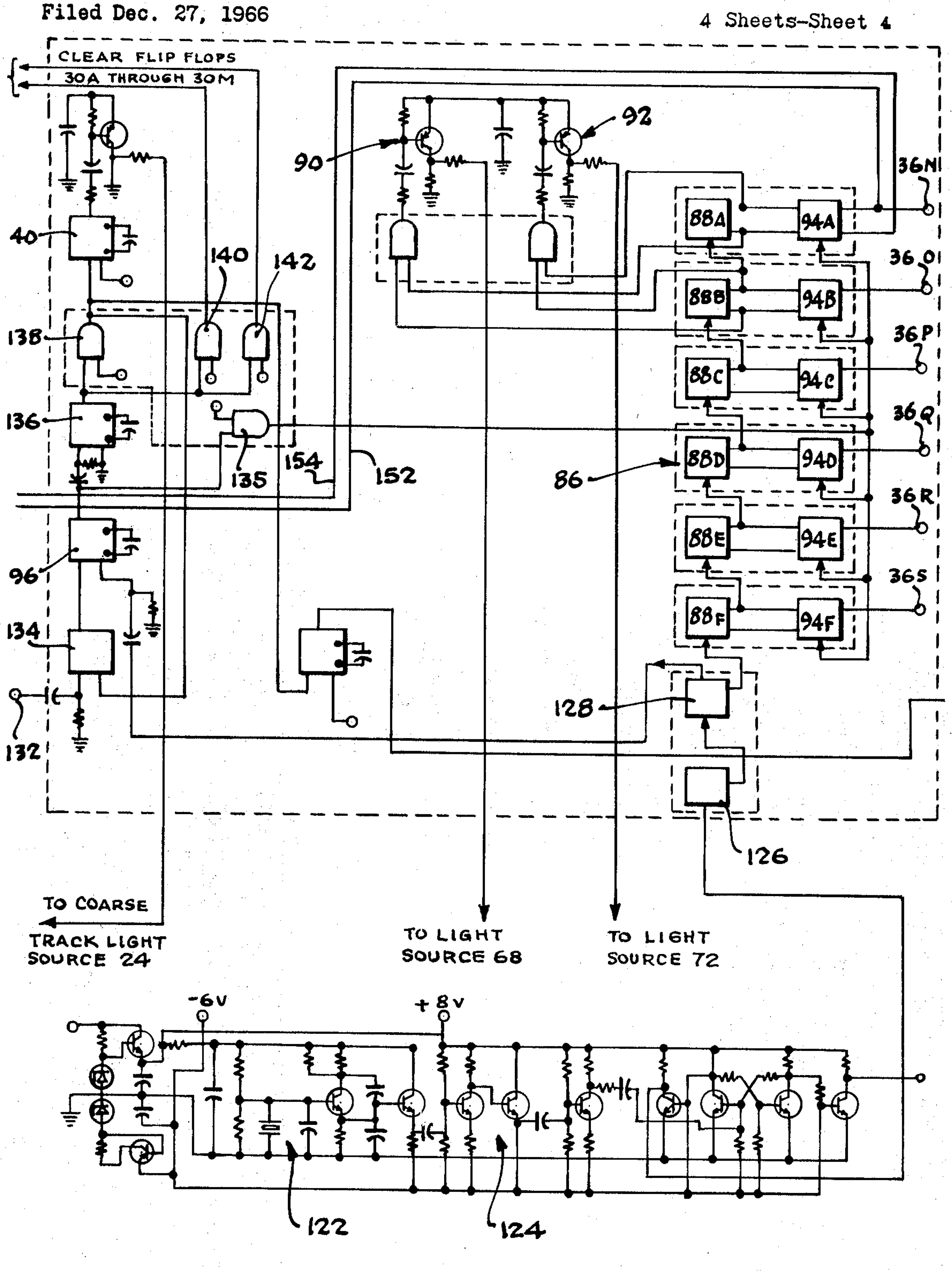
FIG. 6 is a schmatic electrical circuit diagram of other elements of the encoder of FIG. 5.

FIG. 6 shows the schematic electrical circuit diagram for the clock oscillator 38. A crystal oscillator 122 is employed to generate sinusoidal oscillations at a frequency of 256 kilocycles. The amplitude of these oscillations is amplified through a series of transistor amplifier stages 124 and impressed upon a divider 126 which reduces the frequency to 128 kilocycles. The output of the divider is impressed upon a second divider 128 which reduces the frequency to 64 kilocycles. The output of divider 128 is then impressed upon the binary counter 86, which is illustrated in FIG. 6 as well as FIG. 1.

The output of the tuned amplifiers 84, illustrated in FIG. 5, appears on terminal 130 and is impressed upon the input terminal 132 of FIG. 6. The output terminal 130 of FIG. 5 is electrically connected to the input terminal 132 of FIG. 6 and hence, to one of the input terminals of a flip-flop 134. The output of the flip-flop 134 is connected to one-shot multivibrator 96, and the output of the one-shot multivibrator 96 is connected through a gate circuit 135 to provide the store command for the storage flip-flops 94A through 94F.

The store command, however, must not occur at a time when the fine counter flip-flops 88A through 88F are changing, and hence the output stage 128 of the clock is electrically connected to a second input terminal of the one-shot multivibrator 96. When the output of the tuned amplifier 84 changes from a "0" to a "1," the flip-flop 134 is preset, and the output of the flip-flop 134 is used to release the inhibit input of the one-shot multivibrator 96. The next clock pulse from the divider 128 is impressed upon the one-shot multivibrator 96 and generates a store command pulse which passes through the gate 136 to control the interrogation of the counter 86. At the same time, the trailing edge of the pulse from the one-shot multivibrator 96 triggers a second one-shot multivibrator 136. The output of this multivibrator drives three inverters 138, 140, and 142. Inverters 140 and 142 are utilized to clear the flip-flops 30A through 30M, and the inverter 138 is utilized to clear the flip-flop 134 located at the beginning of the synchronization logic. The output of the flip-flop 134 thereupon inhibits one-shot multivibrator 96 so that no further clock pulses can trigger it. In this manner, interrogation of the counter flip-flops 88A through 88F occur approximately at the time center of their binary states.

It is also to be noted that the output of the inverter 138 drives one-shot multivibrator 40, and hence the light source 24.

The commercial embodiment of the encoder described in this application utilizes a disc 12 which contains 15 tracks, 18 and 48. Fourteen of the tracks, namely those tracks controlling the electrical output of photocells 26A through 26N, directly read Gray cyclic code, and the track confronting photocell 26N contains $2^{14}$ transparent and $2^{14}$ opaque sectors. The fine track 48 contains $2^{13}$ transparent and $2^{13}$ opaque sectors. The fourteen Gray code tracks are translated to natural code. Electrical output of the fine track corresponding to the $2^{14}$ digit may thus be compared with the translated electrical output from the coarse $2^{14}$ tracks, namely tracks 18, and this comparison utilized to bring the coarse digits appearing on terminals 36A through 36M into alignment with the fine digit output appearing on terminals 36N through 36S. Since the output on terminal 36N is the same as that produced by translating the Gray code of the fourteen tracks 18 into binary code, this track has no output terminal.

Since the coarse digits will in all cases either be the same as the fine digits, or one count low, it is simply necessary to add one count to each of the coarse digits when the two fail to agree. For this purpose, a comparing device 146 is utilized to compare the output of flip-flop 94A with the output of photocell amplifier 28N, and if these outputs do not agree in binary number, a count of one is added to the add-one element 35M. Since adding one to the output of the coarse tracks of the encoder may require all fourteen of the coarse tracks to change, each of the add-one stages 35A through 35M is provided with a carry-one mechanism and an interconnection designated 150. This circuit is fully shown in FIG. 7. The output of the fine storage flip-flop 94A is electrically connected by conductors 152 and 154 (FIG. 6) to the comparing device 146 illustrated in FIG. 7. The comparing device includes a flip-flop 30N connected to the output of amplifier 28N and two input Nand gates 156 and 158 connected to the output of the flip-flop 30N and to the connecters 152 and 154 which carry the output from the flip-flop, as shown in FIG. 6. In the event the readout of the coarse track 144 of the encoder differs from the readout of the fine track 36N, a count of "one" is added by a pulse on the add wire designated 160 to the next coarser digit. In this manner, the coarse digits of the encoder are brought into correlation with the fine digits of the encoder.

From the foregoing disclosure, those skilled in the art will readily devise many modifications and uses of the present invention here set forth. It is therefore intended that the scope of the present invention be not limited by the foregoing disclosure but rather only by the appended claims.

The invention claimed is:

1. An analog to digital encoder for encoding shaft angle displacements from an arbitrary zero position comprising a code disc mounted normally on the shaft for rotation therewith, said code disc having a circular track coaxial with the shaft having a plurality of transparent sectors of equal length separated by opaque sectors of equal length, a light source mounted on one side of the code disc confronting the track of the code disc, a first photoresponsive cell mounted in a fixed position on the opposite side of the code disc confronting the track and the light osurce, said light source and first photoresponsive cell being centered on an opaque sector of the track when the shaft is disposed in its zero position, a second photoresponsive cell mounted in a fixed position on the side of the code disc opposite the light source confronting the track and light source, said light source and second photocell being centered on a transparent sector of the track when the shaft is disposed in its zero position, a first means for periodically generating an electrical potential electrically connected to the first photoresponsive cell, said first means being responsive to the magnitude of the electrical output of the first photoresponsive cell during a time period short compared to the period of said first generating means, a second means for periodically generating an electrical potential electrically connected to the second photoresponsive cell, said second means being responsive to the magnitude of the electrical output of the second photoresponsive cell during a short time period displaced in time from the time period of the first means by a time interval equal to one-fourth of the period of the first generating means, means for combining the fundamental frequency component of the electrical output of the first generating means with the fundamental frequency component of the electrical output of the second generating means, and means for digitizing the phase difference between said combined signal and the period of said first periodic generating means, whereby said digital value is a measurement of the displacement of the shaft within a single electrical cycle.

2. An analog to digital shaft angle encoder comprising the combination of claim 1 wherein the means for combining the fundamental frequency components of the electrical output of the first generating means with the fundamental frequency component of the electrical output of the second generating means comprises an amplifier tuned to the frequency of the period of the first and second means for generating an electrical potential.

3. An analog to digital shaft angle encoder comprising a first electromechanical transducer mechanically coupled to the shaft, said first transducer generating an electrical output for all angular positions of the shaft having a magnitude equal to the value of a sine function of the shaft angle from a zero angle position, a second electromechanical transducer mechanically coupled to said shaft, said second transducer generating an electrical output for all angular positions of said shaft displaced from said zero position having a magnitude equal to the value of the cosine function, a first means for periodically generating an electrical potential electrically connected to the first transducer, said first means being responsive to the magnitude of the electrical output of the first transducer during a time period short compared to the period of said generating means, a second means for periodically generating an electrical potential electrically connected to the second transducer, said second means being responsive to the magnitude of the electrical output of the second transducer during a short time period displaced in time from the time period of the first means by a time interval equal to one-fourth of the period of the first generating means, means for combining the fundamental frequency component of the electrical output of the first generating means with the fundamental frequency component of the electrical output of the second generating means, and means for digitizing the phase difference between said combined signal and the period of said first periodic generating means comprising a multistage counter having one stage for each digit to be generated, said stages being electrically connected in cascade and each stage producing in its output the same fraction of counts as each other stage, an oscillator electrically connected to the first of the cascade connected stages of the counter having a frequency equal to a multiple of the period of the first means for periodically generating an electrical potential, said multiple being equal to the number of stages and the oscillator being synchronized with the first means for periodically generating an electrical signal, whereby said counter continuously counts the cycles of the oscillator, a plurality of electrical storage devices, one electrical storage device being electrically connected to each of the stages of the counter and each electrical storage device having a command input, each storage device in response to an electrical command signal impressed on the command input storing the output of the connected stage of the counter, a pulse generator having an output electrically connected to each of the command inputs of the storage devices and an input electrically connected to the means for combining the output of the first generating means with the output of the second generating means.

4. An analog to digital encoder for encoding shaft angle displacements from an arbitrary zero position comprising a code disc mounted normally on the shaft for rotation therewith, said code disc having a circular track coaxial with the shaft having a plurality of transparent sectors of equal length separated by opaque sectors of equal length, a first light source mounted in a fixed position on one side of the code disc confronting the track of the code disc, said first light source producing a pulse of light in response to excitation thereof, a first photoresponsive cell mounted in a fixed position on the opposite side of the code disc confronting the track and the first light source, said first light source and first photoresponsive cell being centered on an opaque sector of the track when the shaft is disposed in its zero position, a second light source mounted in a fixed position on a side of the code disc confronting the track thereof, said second light source producing a pulse of light in response to excitation thereof, a second photoresponsive cell mounted in a fixed position on the side of the code disc opposite the second light source, confronting the track and second light source, said second light source and second photocell being centered on a transparent sector of the track when the shaft is disposed in its zero position, means electrically connected to the first light source for periodically exciting the first light source to produce a light pulse, means electrically connected to the second light source for exciting the second light source at the period as the first light source, said second light source being excited at times displaced from the excitation times of the first light source by one-fourth of a cycle of said period, means electrically connected to the first and second photoresponsive cells for combining the fundamental frequency component of the first cell with the fundamental frequency component of the second cell, and means for digitizing the phase difference between said combined signal and the period of said first means for exciting the first light source.

References Cited

UNITED STATES PATENTS

| | | | |
|---|---|---|---|
| 3,255,448 | 6/1966 | Sadvary et al. | 340—347 |
| 3,234,361 | 2/1966 | McLaren et al. | 340—347 |
| 3,043,962 | 7/1962 | Jones | 340—347 |
| 2,986,726 | 5/1961 | Jones | 340—347 |
| 2,894,256 | 7/1959 | Kronacher | 340—347 |

FOREIGN PATENTS 1,344,337 10/1963 France.

MAYNARD R. WILBUR, Primary Examiner

J. GLASSMAN, Assistant Examiner